3,215,643
USE OF SULFUR-CONTAINING SILOXANES AS SOLVENT FOAMERS
Daniel R. Pail, Midland, Mich., assignor to Dow Corning Corporation, Midland, Mich., a corporation of Michigan
No Drawing. Filed Nov. 24, 1961, Ser. No. 154,813
13 Claims. (Cl. 252—364)

This invention relates to a method for foaming solvents with sulfur-containing siloxane copolymers and to foaming compositions comprising such solvents and sulfur-containing siloxane copolymers.

It is an object of this invention to provide a method for foaming certain solvents. It is a further object to prepare compositions of matter of increased foaming tendencies.

Although there are many well-known methods for foaming aqueous solutions, there have been few satisfactory methods for foaming organic solvents prior to this invention. A solvent of increased foaming tendencies is a useful solvent in wax formulations because it facilitates the application of the wax to a surface. Solvents of increasing foaming tendencies are useful in keeping catalysts suspended in catalytic cracking operations (e.g., such as in petroleum cracking operations).

This invention relates to a composition of matter of increased foaming tendencies comprising (1) a solvent selected from the group consisting of hydrocarbons and halogenated hydrocarbons containing therein
(2) from 0.01 to 10 percent by weight based upon the weight of (1) a sulfur-containing siloxane copolymer containing an average of from 1.75 to 2.1 organic radicals per silicon atom, said copolymer consisting essentially of
   (A) from 0.45 to 12 mol percent units of the formula

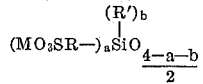

wherein M is selected from the group consisting of $NH_4^+$ ion, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkyl radicals containing from 7 to 18 inclusive carbon atoms, wherein the sulfur atom is attached to a carbon atom in R which is at least the second carbon atom away from the silicon atom, R' is an alkyl radical of from 1 to 4 inclusive carbon atoms and $a$ has an average value of from 1 to 3 inclusive, $b$ has an average value of from 0 to 2 inclusive and the total average value of $a+b$ is from 1 to 3 inclusive, and
   (B) from 88 to 99.55 mol percent siloxane units of the formula

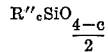

wherein R'' is an alkyl radical of from 1 to 4 inclusive carbon atoms and $c$ has an average value of from 1.75 to 2.1 inclusive, The solvent must be one in which the sulfur-containing siloxane copolymer is at least partially soluble at the temperature at which foaming is desired. Examples of suitable solvents are hydrocarbons such as kerosene, mineral spirits, turpentine, benzene, toluene; halogenated hydrocarbon solvents such as methylchloroform, chlorobenzene, bromobenzene and dichlorodifluoromethane. When the foaming composition of this invention is used in a wax formulation, it is desirable that the solvent be volatile. Otherwise, the volatility of the solvent is not critical. Particularly useful solvents are the aliphatic and alicyclic hydrocarbon solvents.

The solvent contains from 0.01 to 10 percent by weight (based upon the weight of solvent) of a sulfur-containing siloxane copolymer. This copolymer is composed of conventional and sulfoalkyl-, sulfocycloalkyl- or sulfoaralkyl-siloxane units. There are in the copolymer from 0.45 to 12 mol percent sulfoalkyl-, sulfocycloalkyl- or sulfoaralkyl-siloxane units of the formula

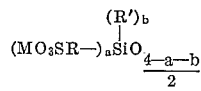

wherein M can be an $NH_4^+$ ion; alkali metal atom such as lithium, sodium, potassium and cesium atoms, and hydrogen atoms. R is a divalent hydrocarbon radical selected from the group consisting of alkylene radicals containing from 2 to 30 inclusive carbon atoms, cycloalkylene radicals containing from 4 to 14 inclusive carbon atoms and aralkyl radicals of from 7 to 18 inclusive carbon atoms. Illustrative of alkylene radicals that R represents are $-CH_2CH_2CH_2-$, $-CH_2CH(CH_3)CH_2-$, $-CH_2CH(CH_2CH_3)CH_2-$, $-CH_2(CH_2)_4CH_2-$, $-CH_2(CH_2)_3CH_2-$ and $-CH_2(CH_2)_{28}CH_2-$. Illustrative of the cycloalkylene radicals that R represents are

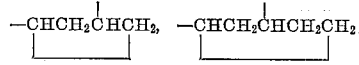

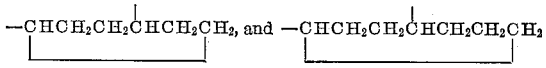

The sulfur atom is attached to a carbon atom in the alkylene or cycloalkylene radical which is at least the second carbon atom away from the silicon atom. Illustrative aralkyl radicals that R represents are $-C_6H_4CH_2CH_2-$, $C_6H_4(CH_2)_6-$ and $-C_{10}H_6C_2H_4-$. Preferably R is an alkylene radical of from 3 to 18 carbon atoms. R' is an alkyl radical of from 1 to 4 inclusive carbon atoms. Illustrative of such alkyl radicals are methyl, ethyl, propyl and butyl. There is an average of from 1 to 3 sulfur-containing radicals per silicon atom and from 0 to 2 alkyl radicals per silicon atom. There is a total average of from 1 to 3 total $MO_3SR-$ and R' radicals per silicon atom.

Sulfur-containing siloxanes where R is either an alkylene or cycloalkylene radical are disclosed in the copending application Serial No. 154,811, of John W. Ryan entitled, "Sulfur-Containing Organosilicon Compounds," filed simultaneously herewith on November 24, 1961, and hereby incorporated by reference. Methods for making these sulfoalkyl- and sulfocycloalkylsiloxanes are disclosed in that application. In general, these siloxanes are prepared by oxidizing either a siloxane thiuronium salt or thiocyanoalkyl- or thiocyanocycloalkylsiloxane. Salts of these sulfoalkyl- and sulfocycloalkylsiloxanes are prepared by the reaction of a sulfoalkyl- or sulfocycloalkylsiloxane with a base such as sodium hydroxide, potassium hydroxide, ammonium hydroxide or the like or by treatment with ammonia. These methods of preparation are described in detail in Ryan's copending application.

The sulforalkylsiloxanes that are useful in this invention are disclosed in U.S. Patent 2,968,643 (Bailey) which is hereby incorporated by reference. Methods for preparing these siloxanes are also disclosed in the Bailey patent. One satisfactory method for preparing these sulfoaralkylsiloxanes is to sulfonate an aralkylsiloxane with a sulfonating agent such as fuming sulfuric acid or sulfuric trioxide. This and other methods for preparing these sulfoaralkylsiloxanes are described in detail in the Bailey patent. Salts of these sulfoaralkylsiloxanes are prepared by the reaction of a sulfoaralkylsiloxane with a base as described above.

These sulfur-containing siloxanes are copolymerized with from 88 to 99.55 mol percent of conventional siloxanes of the formula

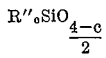

R″ is an alkyl radical of from 1 to 4 inclusive carbon atoms. The subscript $c$ has an average value of from 1.75 to 2.1 inclusive. There is an average of from 1.75 to 2.1 total organic radicals (includes all the organic radicals in the copolymer) per silicon atom in the copolymer. It is preferred that the copolymer have from 1.9 to 2.05 organic radicals per silicon atom.

The copolymers containing sulfoalkyl- and sulfocycloalkyl-radicals are described in the Ryan application. Methods for preparing these copolymers are also described in that application. In general, these copolymers are prepared by mixing and heating a conventional siloxane and a sulfoalkyl- or sulfocycloalkylsiloxane together. These copolymers are also prepared by mixing and heating the sulfoalkyl- or sulfocycloalkylsiloxane and a conventional cyclic siloxane. Salts of these sulfoalkyl- and sulfocycloalkyl-siloxanes are prepared either before or after copolymerization by reaction of the siloxane with a base, as described above. The copolymers containing sulfoaralkylsiloxane units are prepared by the same method.

Although good results are obtained when from 0.01 to 10 percent by weight (based on the weight of solvent) of the copolymer are used, best results are obtained when from .05 to 2 percent by weight are used. Although from 0.45 to 12 mol percent of the copolymer can be sulfur-containing siloxane units, there is usually no particular advantage in using more than 7.5 mol percent of such units.

The method for foaming the solvents comprises dissolving from 0.01 to 10 percent by weight (based on the weight of solvent) of the sulfur-containing siloxane copolymer in the solvent and then mixing a gas with the above solution in such a manner that a foam is produced. The gas can be mixed with the liquid solvent by chemical generation of gas in the liquid or by mechanical introduction into the liquid, for example by injection under the surface, by beating or by occlusion under a stream of liquid impinging on the liquid. The simplest method for producing the foam is by agitating the composition.

The foaming compositions of this invention are useful as solvents in wax formulations. The foaming tendencies of these compositions aids in applying the wax to a surface. This is thought to be at least partially due to the lubricity of the foam. The foaming compositions of this invention are generally useful in any place a foaming solvent is desired.

The following examples are illustrative only and should not be construed as limiting the invention which is properly delineated in the appended claims. The sulfur-containing homopolymers which are used to produce the following copolymers are disclosed in the copending Ryan application and Bailey patent, supra.

*Example 1*

A 350 cps. dimethylsiloxane fluid endblocked with trimethylsilyl units (49.8 g., .673 mol) was heated and stirred with a siloxane of the unit formula

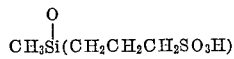

(16.6 g., .091 mol). A cloudy gum was formed which was cooled and dissolved in 50 ml. of isopropanol. The solution was made basic by adding 5 percent sodium hydroxide (70 ml.). A small piece of Dry Ice was added to neutralize the excess sodium hydroxide in the water and isopropanol was evaporated on a steam bath and then in a vacuum oven. The product was a copolymeric siloxane containing 88.2 mol percent $(CH_3)_2SiO$ units and 11.8 mol percent

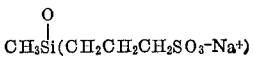

units.

*Example 2*

A 350 cps. dimethylsiloxane endblocked with trimethylsilyl units (200 g., 2.7 mols), was stirred and heated with 40 g. (0.22 mol) of a siloxane of the formula

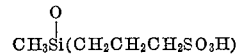

until a cloudy gum formed. An additional 80 g. (1.1 mols) of the 350 cps. dimethylsiloxane and 80 g. (1.1 mols) of cyclic dimethylsiloxane was then added. The mixture was again stirred and heated until a cloudy gum formed. The gum was then dissolved in 75 ml. of isopropanol and stirred and heated for one and one-half hours. The solution was made basic by the addition of 170 ml. of 5 percent sodium hydroxide. A small piece of Dry Ice was then added to neutralize the excess sodium hydroxide. The water and isopropanol were then evaporated on a steam bath and then in a vacuum oven. A copolymeric siloxane containing 95.7 mol percent dimethylsiloxane units and 4.3 mol percent

units was obtained.

*Example 3*

Dimethylsiloxane fluid endblocked with trimethylsilyl units (15 g., 0.2 mol) was heated and stirred with a siloxane of the unit formula

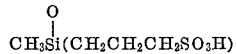

(3 g., .017 mol) until a cloudy gum formed. An additional 182 g. (2.5 mols) of the dimethylsiloxane fluid was added and the reaction mass further heated until a hazy fluid formed. The solution was neutralized with ammonia vapors. The copolymer was then heated on a steam bath to remove the excess ammonia. The product obtained is a copolymeric siloxane containing 99.3 mol percent dimethylsiloxane units and 0.7 mol percent

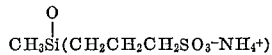

units.

*Example 4*

A 350 cps. dimethylsiloxane fluid endblocked with trimethylsilyl units (200 g., 2.7 mols) was heated and stirred with a siloxane of the unit formula

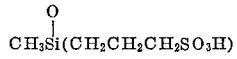

(40 g., 0.22 mol) until a gum had formed. An additional 280 g. (3.8 mols) of the dimethylsiloxane fluid and 280 g. (3.8 mols) of cyclic dimethylsiloxane were added to the reaction mass. The reaction mass was stirred and heated until a gun formed which was dissolved in 200 ml. of isopropanol. The solution was neutralized by adding 170 ml. of 5 percent sodium hydroxide. The solvent was evaporated on a steam bath overnight and then in a vacuum oven. The product is a copolymeric siloxane containing 97.9 mol percent dimethylsiloxane units and 2.1 moles percent

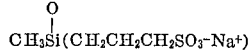

units.

Example 5

Cyclic dimethylsiloxane (19 g., .26 mol), a siloxane of the formula

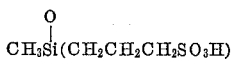

(1 g., .0055 mol) and hexamethyldisiloxane (.2 g., .0025 mol) were heated and stirred together. The gum was dissolved in isopropanol. The product was then divided into 3 parts. No further treatment was given to Sample A. Sample A is a copolymeric siloxane composed of 2.1 mol percent of units of the formula

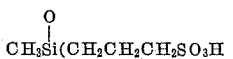

.8 mole percent units of the formula $(CH_3)_3SiO$ and 97.1 mol percent dimethylsiloxane units.

Sample B was evaporated on a steam bath until a cloudy gum was formed. It was then cooled rapidly on Dry Ice and placed in a vacuum oven at room temperature for one hour.

Sample C was neutralized with 2.5 percent sodium hydroxide in 50 percent ethanol, evaporated and placed in a vacuum oven at 60° C. for 12 hours.

Example 6

A siloxane of the formula

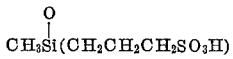

(1 g., .005 mol) cyclic dimethylsiloxane (19 g., .26 mol) and 13 g. of isopropanol were heated at 60° C. for 12 days. The gum obtained was dissolved in a mixture of 4 ml. of toluene and 1 ml. of isopropanol. The copolymer was then neutralized with 2.5 percent aqueous sodium hydroxide and a small piece of Dry Ice was added to neutralize the excess sodium hydroxide. The solvent was then evaporated and the product dried overnight in a vacuum oven at 60° C. The copolymer contained 1.9 mol percent siloxane units of the formula

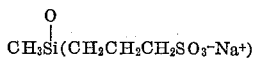

and 98.1 mol percent of dimethylsiloxane units.

Example 7

Dimethylsiloxane fluid (32 g., .43 mol) and a siloxane of the unit formula

(10 g., .036 mol) were heated and stirred together until they became homogeneous. An additional 20 g. (.27 mol) of dimethylsiloxane fluid was added. The reaction mass was then heated and stirred at 150° C. (mantle temperature) until it became homogeneous. After cooling, the reaction mass was dissolved in 50 ml. of isopropanol and then neutralized with 135 ml. of .25 N sodium hydroxide. An additional 60 ml. of isopropanol was then added. The product was a copolymeric siloxane containing 5.4 mol percent units of the formula

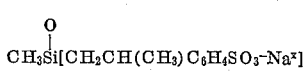

and 94.6 mol percent dimethylsiloxane units.

Example 8

Dimethylsiloxane fluid (30 g., .41 mol) and a siloxane of the unit formula

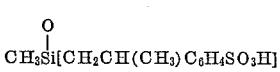

(10 g., .036 mol) were heated together for one hour at 175° C. (mantle temperature). An additional 40 g. (.54 mol) of dimethylsiloxane fluid and 20 g. (.27 mol) of cyclic dimethylsiloxane were added to the reaction mass. The reaction mass was then heated to about 175° C. (mantle temperature) until a homogeneous gum was formed. The gum was then dissolved in 275 ml. of isopropanol and neutralized with 160 ml. of .25 N sodium hydroxide. The product was a copolymeric siloxane composed of 3 mol percent units of the formula

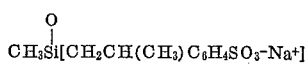

and 97 mol percent dimethylsiloxane units.

Example 9

A dimethylsiloxane fluid (30 g., .41 mol) and a siloxane of the unit formula

(10 g., .036 mol) were heated at 170° C. (mantle temperature) until the solution was homogeneous. An additional 52 g. (.7 mol) of dimethylsiloxane and 50 g. (.68 mol) of cyclic dimethylsiloxane was added to the reaction mass. The reaction mass was then heated until it became viscous. After cooling, the gum was dissolved in 125 ml. of isopropanol and neutralized with 52 ml. of 1.0 N KOH. The product was a copolymeric siloxane containing 2 mol percent

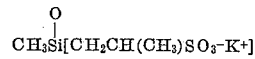

units and 98 mol percent $(CH_3)_2SiO$ units.

Example 10

A dimethylsiloxane fluid (30 g., .41 mol) and a siloxane of the unit formula

(10 g., .036 mol) were heated together until viscous. An additional 360 g. (4.9 mol) of dimethylsiloxane fluid and 100 g. (1.35 mol) of cyclic dimethylsiloxane were heated with the reaction mass until the mass became homogeneous. A 100 g. of 50 to 50 mixture of benzene and isopropanol was then added. Ammonia was then bubbled through the copolymer. The solvents were then evaporated on a steam bath. The product obtained was a copolymeric siloxane containing 1.6 mol percent

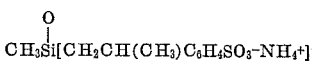

units and 98.4 mol percent $(CH_3)_2SiO$ units.

Example 11

A dimethylsiloxane fluid (220 g., .28 mol) and a siloxane of the unit formula

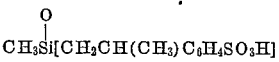

(73 g., 28 mol) were heated and stirred together for 1½ hours at 125 to 130° C. An additional 147 g. (2 mols) of dimethylsiloxane fluid was then added. The reaction mass was then heated and stirred for several hours. The product was then cooled while isopropanol was added. The material was then filtered and the isopropanol distilled out. The material was then neutralized by adding sodium hydroxide and a small piece of Dry Ice was then added to neutralize any excess sodium hydroxide. The solvent was then evaporated on a steam bath. The product obtained was a copolymeric siloxane containing 5.3 mol percent

units and 94.6 mol percent $(CH_3)_2SiO$ units.

*Example 12*

A dimethylsiloxane fluid (30 g., .41 mol) and a siloxane of the unit formula $$CH_3\overset{O}{\underset{|}{Si}}[CH_2CH(CH_3)C_6H_4SO_3H]$$

(6 g., .022 mol) were stirred and heated until homogenous. An additional 75 g. (1.0 mol) of dimethylsiloxane fluid and 189 g. (2.6 mols) of cyclic dimethylsiloxane was then added and then heating continued until a clear viscous material resulted. The material was neutralized with 11 percent sodium hydroxide in 50 percent ethanol and 80 g. of isopropanol was added. The solvent was then evaporated and the material placed in a vacuum oven overnight. The product obtained was a copolymeric siloxane containing .6 mol percent

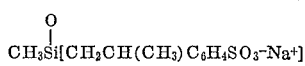

units and 99.4 mol percent $(CH_3)_2SiO$ units.

*Example 13*

The foaming effect of various siloxane copolymers, various solvents are measured in this example. The siloxane copolymers prepared in the above examples were dissolved in the solvents listed in the following table. After the copolymer was dissolved in the solvent, the solvent was shaken vigorously ten times. The time in seconds required for the foam produced to rupture was then measured. The materials were tested immediately and several hours (i.e., from 24 to 72 hours) after being dissolved in the solvent. The percent concentration of siloxane copolymers in the solvent is based on the weight of solvent.

| Mol percent | Siloxane copolymer | Solvent |
|---|---|---|
| 99.5 | $(CH_3)_2SiO$ units and | Hexane. |
| 0.5 | $(CH_3)_2Si[CH_2CH_2C_6H_4SO_3^-NH_4^+]$ $\underset{O_{0.5}}{|}$ | |
| 98 | $(CH_3)_2SiO$ units and | dichlorodifluoromethane. |
| 2 | $(HO_3SC_{10}H_6CH_2CH_2)\overset{O}{\underset{|}{Si}}(CH_3)$ | |
| 98 | $(CH_3)_2SiO$ units and | Benzene. |
| 2 | $(C_2H_5)Si[(CH_2)_4SO_3H]$ $\underset{O}{|}$ | |
| 90 | $(CH_3)_2SiO$ units and | Carbon tetrachloride. |
| 10 | $(C_3H_7)Si[(CH_2)_{30}SO_3^-Na]$ | |
| 98 | $(CH_3)_2SiO$ units and | Chlorobenzene. |
| 2 | $(CH^e)Si[—CH\diagup\overset{CH_2}{\underset{CH_2}{\diagdown}}CHSO_3H]$ | |
| 98 | $(CH_3)_2SiO$ units and | Toluene. |
| 2 | $(CH_3)Si[(CH_2)_6SO_3^-K^+]$ $\underset{O}{|}$ | |
| 98 | $(CH_3)_2SiO$ units and | Kerosene. |
| 2 | $\underset{O_{1.5}}{|}$ $Si(CH_2CH_2CH_2SO_3H)$ | |
| 98 | $(CH_3)_2SiO$ units and | Naphtha. |
| 2 | $\underset{O_{.5}}{|}$ $Si(CH_2CH_2CH_2SO_3^-NH_4^+)_3$ | |

TABLE

| Percent by wt. copolymer | Kerosene | | A commercial solvent naphtha min. spirits | | V. M. and P. naphtha | | Turpentine | | Methylchloroform | |
|---|---|---|---|---|---|---|---|---|---|---|
| | Initial | Final | Initial | Final | Initial | Final | Initial | Final | Initial | Final |
| No additive | 9 | 9 | 1 | 1 | <1 | <1 | 2.5 | 2.5 | <1 | <1 |
| 1% of Example 1 | | | 15 | 90 | 1 | 45 | 540 | 630 | 150 | 160 |
| 1% of Example 2 | | | 390 | 580 | 9 | 50 | >1,800 | >5,400 | 250 | 195 |
| 1% of Example 3 | | | 540 | 540 | 17 | 17 | 300 | 300 | 660 | 610 |
| 1% of Example 4 | | | 54 | 255 | 4 | 25 | 990 | 1,440 | | |
| .5% Sample A, Ex. 5 | | | 6 | 13 | 1 | 1 | 34 | 23 | | |
| .5% Sample B, Ex. 5 | | | 65 | 71 | 18 | 17 | 220 | 120 | | |
| .5% Sample C, Ex. 5 | | | 230 | 260 | 10 | 9 | 60 | 1,800 | | |
| .5% of Example 6 | | | 240 | 990 | 20 | 10 | 540 | 4,860 | | |
| 1% of Example 6 | | | | | | | | | 180 | 140 |
| 2% of Example 7 | 105 | 1,260 | 30 | 990 | 1.5 | 2.5 | | | | |
| 2% of Example 8 | 510 | >900 | 180 | 630 | 1.0 | 6.0 | | | | |
| 2% of Example 9 | 900 | >960 | 270 | 585 | 1.5 | 51 | | | | |
| 1% of Example 10 | | | | 780 | | 3 | | 3,600 | 240 | 175 |
| 1% of Example 11 | | | | | | | | | >78 | 1,800 |
| 1% of Example 12 | | | | 375 | | 17 | | 1,800 | >78 | 865 |

*Example 14*

When the following sulfur containing siloxane copolymers are dissolved (at a 1 percent concentration by weight based on the weight of solvent) in the following solvents and the solution then agitated, a foam is produced. The copolymers are prepared in accordance with the procedure of Example 1. The sulfur-containing siloxane salts are prepared by neutralizing the copolymer with either an ammonium or alkali metal hydroxide.

When 0.05 percent by weight of the copolymer of Example 9 is added to kerosene and the solution then agitated, a foam is produced.

That which is claimed is:

1. A composition of matter of increased foaming tendencies consisting essentially of
  (1) a solvent selected from the group consisting of hydrocarbons and halogenated hydrocarbons containing therein, (2) from 0.01 to 10 percent by weight based upon the weight of (1) of a sulfur-containing siloxane copolymer containing an average of from 1.75 to 2.1 organic radicals per silicon atom, said copolymer consisting essentially of (A) from 0.45 to 12 mol percent units of the formula

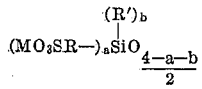

wherein M is selected from the group consisting of $NH_4^+$ ion, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkyl radicals containing from 7 to 18 inclusive carbon atoms, wherein the sulfur atom is attached to a carbon atom in R which is at least the second carbon atom away from the silicon atom, R' is an alkyl radical of from 1 to 4 inclusive carbon atoms and $a$ has an average value of from 1 to 3 inclusive, $b$ has an average value of from 0 to 2 inclusive and the total average value of $a+b$ is from 1 to 3 inclusive, and (B) from 88 to 99.55 mol percent siloxane units of the formula

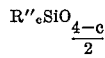

wherein R'' is an alkyl radical of from 1 to 4 inclusive carbon atoms and $c$ has an average value of from 1.75 to 2.1 inclusive, said solvent being one in which said sulfur-containing siloxane copolymer is at least partially soluble at the temperature at which foaming is desired.

2. The composition of claim 1 wherein $a$ and $b$ each have an average value of 1.

3. The composition of matter of claim 1 wherein (1) is a hydrocarbon, M is an alkali metal atom, R is an alkylene radical containing from 3 to 18 inclusive carbon atoms wherein the sulfur atom is attached to a carbon atom in R which is at least the third carbon atom away from the silicon atom, R' and R'' are methyl radicals, and (2) is present in an amount from .05 to 2 percent by weight.

4. The composition of matter of claim 3 wherein $a$ and $b$ each have an average value of 1 and $c$ has an average value of 1.9 to 2.05.

5. A composition of matter of increased foaming tendencies consisting essentially of (1) kerosene containing therein,
(2) from 0.01 to 10 per cent by weight based on the weight of (1) of a sulfur-containing siloxane copolymer consisting essentially of (A) from 0.45 to 12 mol per cent units of the formula

wherein M is an alkali metal atom, and (B) from 88 to 99.55 mol per cent siloxane units of the formula $(CH_3)_2SiO$.

6. A composition of matter of increased foaming tendencies consisting essentially of (1) turpentine containing therein
(2) from 0.01 to 10 percent by weight based on the weight of (1) of a sulfur-containing siloxane copolymer consisting essentially of (A) from 0.45 to 12 mol percent units of the formula

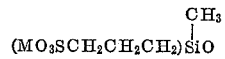

wherein M is an alkali metal atom, and (B) from 88 to 99.55 mol percent siloxane units of the formula $(CH_3)_2SiO$.

7. A composition of matter of increased foaming tendencies consisting essentially of (1) naptha solvent containing therein
(2) from 0.01 to 10 percent by weight based on the weight of (1) of a sulfur-containing siloxane copolymer consisting essentially of (A) from 0.45 to 12 mol percent units of the formula

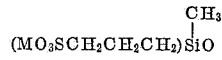

wherein M is an alkali metal atom, and (B) from 88 to 99.55 mol percent siloxane units of the formula $(CH_3)_2SiO$.

8. A method for foaming solvents which comprises (1) dissolving in a solvent selected from the group consisting of hydrocarbons and halogented hydrocarbons from 0.1 to 10 percent by weight based on the weight of said solvent, a sulfur-containing siloxane copolymer containing an average of from 1.75 to 2.1 organic radicals per silicon atom, said copolymer consisting essentially of (A) from 0.45 to 12 mol percent units of the formula

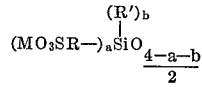

wherein M is selected from the group consisting of $NH_4^+$ ion, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkyl radicals containing from 7 to 18 inclusive carbon atoms, wherein the sulfur atom is attached to a carbon atom in R which is at least the second carbon atom away from the silicon atom, R' is an alkyl radical of from 1 to 4 inclusive carbon atoms and $a$ has an average value of from 1 to 3 inclusive, $b$ has an average value of from 0 to 2 inclusive and the total average value of $a+b$ is from 1 to 3 inclusive, and (B) from 88 to 99.55 mol percent siloxane units of the formula

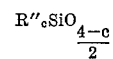

wherein R'' is an alkyl radical of from 1 to 4 inclusive carbon atoms and $c$ has an average value of from 1.75 to 2.1 inclusive, and (2) mixing a gas with (1).

9. The method of claim 8 wherein (1) is foamed by agitating (1) until a foam is produced.

10. The method of claim 8 wherein the solvent is a hydrocarbon, M is an alkali metal atom, R is an alkylene radical containing from 3 to 18 inclusive carbon atoms wherein the sulfur atom is attached to a carbon atom in R which is at least the third carbon atom away from the silicon atom, R' and R'' are methyl radicals and (1) is present in an amount from 0.05 to 2 percent by weight.

11. The method of claim 8 wherein $a$ and $b$ each have an average value of 1 and $c$ has an average value of 1.9 to 2.05.

12. A method for foaming aliphatic hydrocarbon solvents which comprises (1) dissolving in said aliphatic hydrocarbon solvent from 0.01 to 10 percent by weight based on the weight of said solvent, a sulfur-containing siloxane copolymer consisting essentially of (A) from 0.45 to 12 mol percent units of the formula

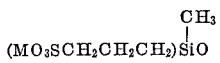

wherein M is an alkali metal atom, and
(B) from 88 to 99.55 mol percent siloxane units of the formula $(CH_3)_2SiO$, and
(2) mixing a gas with (1).

13. A method for foaming alicyclic hydrocarbon solvents which comprises
(1) dissolving in said alicyclic hydrocarbon solvent from 0.01 to 10 percent by weight based on the weight of said solvent, a sulfur-containing siloxane copolymer consisting essentially of
(A) from 0.45 to 12 mol percent units of the formula

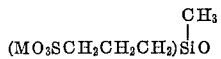

wherein M is an alkali metal atom, and
(B) from 88 to 99.55 mol percent siloxane units of the formula $(CH_3)_2SiO$, and
(2) mixing a gas with (1).

References Cited by the Examiner
UNITED STATES PATENTS

| | | | |
|---|---|---|---|
| 2,151,398 | 3/39 | Weissenborn | 252—307 |
| 2,185,046 | 12/39 | Voorhees | 252—307 |
| 2,719,165 | 9/55 | Cooper | 260—448.2 |
| 2,789,121 | 4/57 | Cooper | 260—448.2 |
| 2,833,735 | 5/58 | Nitzsche et al. | 260—33.6 |
| 2,955,128 | 10/60 | Bailey | 260—448.2 |
| 2,968,643 | 1/61 | Bailey | 260—448.8 |
| 3,006,875 | 10/61 | Liberthson et al. | 260—29.8 XR |

JULIUS GREENWALD, *Primary Examiner.*
LEON J. BERCOVITZ, *Examiner.*